United States Patent
Schwarz et al.

(10) Patent No.: US 6,646,278 B1
(45) Date of Patent: Nov. 11, 2003

(54) IRRADIATING DEVICE

(75) Inventors: Bernd Schwarz, Nürtingen (DE); Gustav Weiss, Altenriet (DE); Günter Fuchs, Oberboihingen (DE); Klaus Ebinger, Köngen (DE); Joachim Jung, Nürtingen (DE)

(73) Assignee: IST Metz GmbH (DE)

( * ) Notice: Subject to any disclaimer, the term of this patent is extended or adjusted under 35 U.S.C. 154(b) by 0 days.

(21) Appl. No.: 09/958,619

(22) PCT Filed: Mar. 31, 2000

(86) PCT No.: PCT/EP00/02916

§ 371 (c)(1),
(2), (4) Date: Oct. 12, 2001

(87) PCT Pub. No.: WO00/61999

PCT Pub. Date: Oct. 19, 2000

(30) Foreign Application Priority Data

Apr. 13, 1999 (DE) .......................... 199 16 474

(51) Int. Cl.$^7$ .............................................. H05B 31/04
(52) U.S. Cl. ..................................... 250/504 R; 34/278
(58) Field of Search .................... 250/492.1, 492.2, 250/493.1, 503.1, 504 R, 455.11; 34/278

(56) References Cited

U.S. PATENT DOCUMENTS

| | | | |
|---|---|---|---|
| 4,563,589 A | * 1/1986 | Scheffer ................. | 250/504 R |
| 4,591,724 A | * 5/1986 | Fuse et al. ............... | 250/492.1 |
| 5,216,820 A | * 6/1993 | Green et al. .................. | 34/273 |
| 5,751,008 A | * 5/1998 | Jung et al. .............. | 250/504 R |
| 6,550,905 B1 | * 4/2003 | Deckers ...................... | 347/100 |

* cited by examiner

*Primary Examiner*—John R. Lee
*Assistant Examiner*—Christopher M. Kalivoda
(74) *Attorney, Agent, or Firm*—Pendorf & Cutliff

(57) ABSTRACT

The invention relates to an irradiating device, especially for irradiating with ultraviolet light substrates which are provided with a coating that can be cured using ultraviolet light. The inventive device comprises a longitudinally extending radiation source (12) which is provided for emitting ultraviolet and/or visible electromagnetic radiation, which is arranged in a housing (10) between a reflector (18) and a housing opening (14) that can be aligned with an object (16) to be irradiated, and which is preferably configured as a tubular mercury discharge lamp. The inventive device also comprises a cooling system (20) for dissipating the waste heat generated by the radiation source (12). The aim of the invention is to create a compact modular construction and, optionally, an oxygen-reduced illumination zone. To this end, the invention provides that the cooling system (20) has a cooling circuit (26) arranged inside the housing (10) and which effects a circulatory cooling of the radiation source (12) by means of a force-conveyed, optionally oxygen-reduced cooling gas steam (28).

24 Claims, 1 Drawing Sheet

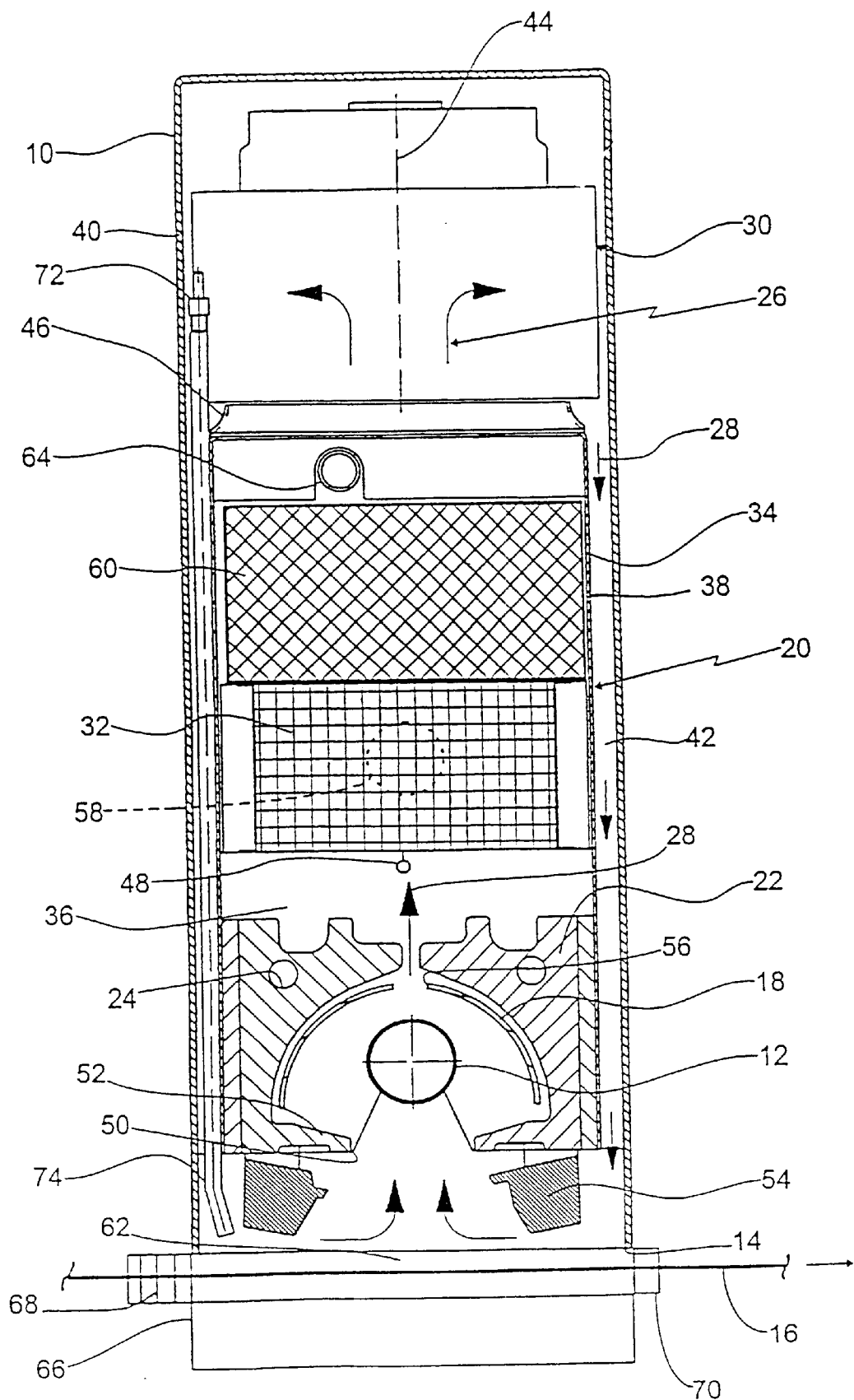

IRRADIATING DEVICE

BACKGROUND OF THE INVENTION

1. Field of the Invention

The invention concerns an irradiating device in particular for the UV-radiation of objects such as substrates coated with a UV-curable layer, the device including a housing, a longitudinally extending irradiation source for ultra-violet and/or visible electromagnetic radiation preferably formed as a tubular shaped mercury lamp provided in the housing between a reflector and a housing opening which can be directed towards the object to be irradiated, and a cooling system for dissipation of waste heat produced by the radiation source.

2. Description of the Related Art

Devices of this type are used for initiation of photochemical reaction of irradiated objects in diverse applications, in particular for cross-linking or curing of layers, printing inks and lacquers on generally flat substrates such as printed materials, however also for acting upon contoured pieces and shaped or molded parts. Generally in the construction of printing machines frequently only a limited amount of space is available, and in rapid through-put in the printing line or, as the case may be, short cycles, it becomes necessary to work with high lamp output of up to several 10's of kW per device. Cooling systems are thus necessary and are concerned with removing at least a part of the waste heat via a circulation flow produced externally and drawn linearly through the device. Besides climatic problems in the work space on the basis of the air exchange and the limited cooling ability, there are also difficulties in the hardening of UV-cross linkable photo-polymerizable materials since oxygen in the irradiation zone leads to an inhibition of the free radical initiated chain polymerization. In this context, it has already been proposed to use a UV-transmissive quartz plate in the illumination zone to separate the object from the cooling stream channeled through the apparatus, and to produce an oxygen reduced atmosphere in the area of the object. Besides the substantial construction costs, it has been found to be of disadvantage that soiling and absorption problems occur in the quartz plate, and the separation between illumination source and object is disproportionately increased.

SUMMARY OF THE INVENTION

Beginning therewith it is the task of the invention to improve a device of the above already described type in such a manner, that a simplified and compact construction is made possible, the environment is not negatively impacted by the operation thereof, and numerous employment opportunities are opened in particular for UV-curing.

The invention is based upon the idea of producing substantially self-sufficient modular units or modules, such that the cooling gas stream is produced and guided within the device housing. In accordance therewith it is proposed that the cooling system has a cooling circuit arranged within the housing for circulation-cooling of the radiation source via a positive-force cooling gas stream. Therewith a space-saving compact construction is achieved without requiring a supply and removal channel and without negative impact on the environmental atmosphere. The device can, as a result of its "self contained cooling", also be employed in conditions of high environmental temperature, wherein advantages are particularly seen in the case of combination of IR-drying and UV-cross linking. Further, there is essentially no gas exchange between the gas cooling circulation stream and the radiation zone, so that little dust is stirred up, which is of advantage in the case of wet layers or coatings, or in workspaces which are to be maintained dust-free.

Preferably the cooling circulation flow includes a blower provided within the housing for producing the cooling gas stream. Therein an even and proportional cooling commensurate to the amount of warmth produced can be realized thereby, that the blower comprises a fan of which the suction side faces the longitudinal side of the radiation source. With respect to a modular device construction, it is of advantage, when the blower is comprised of multiple fans provided distributed along the length of the radiation source, preferably radial fans.

In order to be able to conform the cooling capacity of the respective designed devices to the operating conditions it is of advantage when the volumetric throughput of the blowers can be adjusted in accordance with the detected signal of a temperature sensor provided within the housing, and preferably by automatically regulating the speed of rotation of the fans.

An optimal, high volume circulation stream can advantageously be achieved thereby, that the cooling gas stream circulates essentially perpendicular to the longitudinal direction of the radiation source and is conducted spatially extending over the length thereof.

According to a further preferred embodiment of the invention the cooling circulation flow exhibits a casing space limited or bounded towards the outside by the housing wall and acted upon by blower pressure. By this means any possible leakages do not have negative consequences. A further improvement in this respect can be achieved thereby, that the cooling circulation flow includes a suction space connected to the suction side of the blower, with which the wall, in comparison to the housing wall provided on the pressure side of the blower, defines a return flow channel for the cooling gas. Therewith it is also possible to maintain large surface area laminar flow conditions during the gas return guidance through the radiation zone.

An advantageous embodiment with regard to construction envisions that the suction space is formed by a box-like housing insert, whereby the housing insert longitudinally covers over the radiation source in the manner of cowling or covering and faces the radiation opening of the housing opening. Therein it is advantageous, for the guidance of the intended flow, when the housing insert on its end surface opposite the radiation opening exhibits at least one outlet in communication with the suction side of a blower preferably formed as a radial fan.

For a device integrated re-cooling of the cooling gas stream, it is proposed that a heat exchanger with cooling means, preferably cooling water, is provided in the cooling circulation flow path. A flexible device construction with respect to the construction length is achieved thereby, that the heat exchanger is formed of multiple heat exchanger modules arranged adjacent to each other in the longitudinal direction of the radiation source.

Ozone as well as detrimental substances, in particular foreign substances evaporating from the object, can be eliminated thereby, that an active carbon filter and optionally a dust filter are provided in the cooling circulation flow which are flowed through by the cooling gas stream. Therein it is of further of advantage when the radiation source, the reflector, the heat exchanger and the active carbon filter are provided in the suction chamber to be flowed through sequentially.

According to a particularly advantageous embodiment of the invention it is envisioned that the cooling circulation flow contains an inert gas as cooling gas which is chemically reaction poor or reaction inert in the radiation conditions, so that even with materials which are difficult to cure or harden optional reaction conditions can be created. Therein the cooling circulation stream can contain oxygen-reduced air or nitrogen or carbon dioxide as cooling gas, and can preferably be filled with cooling gas with a housing connection in communication with the suction chamber. To prevent entry of foreign gas it is proposed that the cooling gas is maintained in elevated pressure relative to the ambient atmosphere over the entire cooling circulation stream. A further improvement is achieved thereby, that the radiation zone between the edge of the housing opening and the object passing thereby is protected against entry of environmental air by a barrier device. For maintaining the above discussed operating conditions an oxygen sensor designed for determining the oxygen content of the cooling gas stream is provided, of which the measuring or sampling point is in the area of the housing opening.

Further, it can be envisioned that the entirety of the housing is comprised of multiple individual housings or housing components coupled in certain cases via connecting conduits, in which various parts of the cooling system are provided separated from the environmental atmosphere. Therein the connecting conduit can be formed by a double wall connecting pipe or tube for bi-directional cooling gas guidance. In consideration of the possibility of gas leaks it is advantageous when the gas pressure in the jacket or outer annular space of the connecting pipe is higher than in the internal space thereof.

BRIEF DESCRIPTION OF THE DRAWING

In the following the invention will be described in greater detail on the basis of an illustrative embodiment shown schematically in the FIGURE The single FIGURE shows a vertical section through the irradiation device for UV-radiation of a radiation image formed in the illustrative application as a belt or band-like substrate.

DETAILED DESCRIPTION OF THE INVENTION

The irradiation device represented in the FIGURE is comprised essentially of a housing 10, a tubular shaped longitudinally extending radiation source 12 provided in the housing 10 for UV-radiation of a substrate 16 guided by a housing opening 14, a reflector 18 semi-circularly circumscribing the light source 12, as well as a cooling system indicated overall with reference number 20 for removal of waste heat generated in the housing by the operation of the radiation source.

The radiation source 12 comprises an optionally metal halogenide doped mercury vapor gas discharge lamp, in which discharge tube a high current arc discharge produces, besides UV-emissions and visible light, a substantial amount of IR-radiation or, as the case may be, heat. A part of the heat passes through the reflector 18, which is transmissive for the IR-radiation, into a subsequently provided heat collector 22 which extends over the length of the radiation source 12 or, as the case may be, the reflector 18, and the heat is there removed via the cooling medium or fluid flowing through the cooling channel 24. It is basically also possible, in place of such a cold light mirror, to provide a water or air cooled aluminum reflector with higher heat reflection value, in order to supplementally heat the object being treated.

For the additional removal of heat, the cooling system 20 has provided within the housing 10 a cooling circulation flow indicated overall with reference number 26, in which a cooling gas stream (arrows 28 indicating flow) for the circulation cooling of the radiation source 12 is guided in the inside of the housing, is forcefully moved along by means of blower 30 and thereby is guided to a heat exchanger 32 provided downstream from the radiation source 12 for re-cooling. For this purpose the internal space of the rectangular-box shaped housing 10 is subdivided via a cover-like housing insert 34 into two counter-current flow-through spaces. Therein the internal space of the housing insert 34 forms a vacuum chamber 36 connected to the suction side of the blower 30, while a casing space 42, formed on the one side by wall 38 of the housing insert 34 and on the other side by the housing wall 40, communicates with the pressure side of the blower 30 as return flow channel.

The blower 30 is comprised of multiple radial fans 42 distributed over the length of the radiation source 12 or, as the case may be, the housing 10, of which the blower axis 44 is arranged perpendicular to the radiation source 12 and which communicates on the suction side with the vacuum chamber 36 via ring supports 46 on the upper side of the housing insert 34. In this manner the cooling gas stream is circulated as shown by the arrows 28 indicating flow essentially perpendicular to the longitudinal direction of the radiation source 12 flowing evenly over the length thereof. In the case of a change in the lamp capacity (for example, stand-by operation) it is envisioned to conform the volume of conveyed cooling gas by controlling the blower rotation speed, wherein the output signal of a temperature sensor 48 in the flow path of the cooling gas or the radiation source is transmitted to a —not shown —control device as control amplitude signal.

On the inlet side, the suction chamber 36 communicates with the opening 50 of the housing insert 34 which faces the rectangular shaped housing opening 14, which opening 50 is bordered longitudinally by a profile part 52 of the absorption profile 22 which acts as a light barrier. In order to be able to protect the substrate 16 in certain cases from excessive radiation exposure, a closing device 54 is provided, which can be closed in front of the light barrier 52.

The cooling gas flowing into the vacuum chamber 36 alongside the casing space 42 first swirls about the surface of the discharge tube 12 and then flows, via the longitudinal gap in the crown of the reflector 18, through the heat absorber 22 and into the, heat exchanger 32, where it is cooled in cross-flow by cooling water supplied in via the housing support 58. Downstream from the heat exchanger 32 the cooling gas is cleansed of foreign substances by an active carbon filter 60, cleansed in particular of ozone and substances evaporating from the substrate, before it is returned via the blower 30 to the jacket casino space 42. It is basically also possible to conduct the above-described cooling circulation in the reverse direction in order to direct the cleansed cooling gas through the reflector 56 towards the object 16, and therewith to prevent a premature fogging of the reflector surface.

A further supplemental use of the cooling circulation flow 26 is comprised in the possibility of employing a cooling gas which is inert with respect to the radiation induced reactions, in order thereby to achieve in the area of the object 16 an inactivation of the radiation zone 62. For this purpose the cooling circulation flow 26 can be filled for example with nitrogen as the cooling gas via a housing connection 64 communicating with the vacuum chamber 36. By this means the oxygen content in the area of the irradiation zone 62 can be reduced, so that undesired reactions by ozone primarily during hardening or curing of the UV-cross-linkable layers can be prevented. In order to shield the radiation zone 62 against entry of oxygen from the outside and to prevent excessive losses of cooling gas, a shield or barrier arrangement is provided, which seals the substrate 16 passing through between on the one hand the rim of the housing opening 14 and on the other hand a substrate supporting water-cooled base plate 66, and on the inlet side via a doctor blade or squeegee 68 and on the outlet side via an exit air lock 70. An oxygen sensor 72 makes possible, via a sampling pipe 74, a detection of the oxygen content in the area of the housing opening 14.

On the basis of its compact construction the irradiation device can find many uses even in narrow construction conditions. It is suitable for irradiation and rendering inert not only belt-like substances, but rather likewise also rope-like and thread-like articles as well as contoured deformed work pieces.

What is claimed is:

1. An irradiation device for radiation of objects, comprising:
    a housing (10) including a housing wall (40) and a housing opening (14),
    a reflector (18) provided within the housing,
    a radiation source (12) for ultraviolet and/or visible electromagnetic radiation provided in the housing (10) between the reflector (18) and the housing opening (14) and adapted for irradiating an object, and
    a cooling system (20) for removal of waste heat produced by the radiation source (12),
    wherein the cooling system (20) includes a blower (30) for providing a cooling circulation flow (26) within the housing (10) for circulation cooling of the radiation source (12) by a forced-flow cooling gas stream (28), wherein the cooling circulation flow (26) is defined by a suction chamber (36) connected to the vacuum side of the blower (30), and a return flow channel for the cooling gas provided on the pressure side of the blower (30) in a space (42) between the suction chamber wall (38) and the housing wall (40).

2. An irradiation device according to claim 1, wherein said radiation source (12) is a longitudinally extending tubular shaped mercury discharge lamp.

3. An irradiation device according to claim 2, wherein the blower (30) comprises a fan having a suction side and a discharge side, of which the suction side is longitudinally in communication with the radiation source (12).

4. An irradiation device according to claim 2, wherein the blower (30) is comprised of multiple fans distributed along the length of the radiation source (12).

5. An irradiation device according to claim 4, wherein the fans are radial fans.

6. An irradiation device according to claim 1, wherein the flow volume of the blower (30) is automatically adjustable corresponding to an output signal of a temperature sensor (48) provided in the housing (10), preferably by adjusting the rotational speed of the blower.

7. An irradiation device according to claim 6, wherein the flow volume of the blower (30) is adjustable by adjusting the rotational speed of the blower.

8. An irradiation device according to claim 1, wherein the radiation source (12) extends longitudinally, and wherein the cooling gas stream (28) circulates essentially perpendicular to the longitudinal direction of the radiation source (12) and along the length thereof.

9. An irradiation device according to claim 1, wherein the radiation source (12) extends longitudinally, wherein the vacuum chamber (36) is formed by a box-like housing insert (34), and wherein the housing insert (34) covers over the radiation source (12) longitudinally in the manner of a cover and has an inlet side facing the radiation transmissive opening (50) of the housing opening (14).

10. An irradiation device according to claim 9, wherein the housing insert (34) on its end opposite to the inlet side has at least one outlet (46) in communication with the vacuum side of the blower (30).

11. An irradiation device according to claim 1, including a heat exchanger (32) for cooling the cooling gas stream (28) is provided in the cooling circulation stream (26) and supplied with cooling means.

12. An irradiation device according to claim 11, wherein said cooling means is cooling water.

13. An irradiation device according to claim 11, wherein the radiation source extends longitudinally, and wherein the heat exchanger (32) comprises multiple heat exchanger modules arranged sequentially in the housing (10) in the longitudinal direction of the radiation source (12).

14. An irradiation device according to claim 1, wherein an active carbon filter (60) and optionally a dust filter are provided in the cooling gas stream (28).

15. An irradiation device according to claim 14, wherein the radiation source (12), the reflector (18), the heat exchanger (32), the active carbon filter (60) and optionally the dust filter are arranged in the vacuum chamber (36) for sequential flow-through.

16. An irradiation device according to claim 1, wherein the cooling circulation flow (26) includes an inert gas as cooling gas, which is chemically reaction poor or reaction inert under the radiation conditions.

17. An irradiation device according to claim 1, wherein the cooling gas stream (26) contains oxygen reduced air or nitrogen or carbon dioxide as the cooling gas.

18. An irradiation device according to claim 1, including a housing connection (64) communicating in the vacuum chamber (36) for filling the cooling gas stream (26) with cooling gas.

19. An irradiation device according to claim 1, wherein the cooling gas is contained or maintained in the entire cooling circulation stream (26) with pressure relative to the atmosphere.

20. An irradiation device according to claim 19, including an air barrier device (68, 70) adapted for protecting the radiation zone (62) against entry of environmental air between the edge of the housing opening (14) and an object (16) passing thereby.

21. An irradiation device according to claim 20, including an oxygen sensor (72) adapted for determining the oxygen content of the cooling gas stream (28), of which the sensing point is provided in the area of the housing opening (14).

22. An irradiation device according to claim 1, wherein the housing (10) is comprised of multiple individual housings, optionally coupled via connecting conduits, in which different parts of the cooling system (20) are arranged.

23. An irradiation device according to claim 22, wherein the connecting conduits are a double wall connecting pipe for bi-directional conveying of cooling gas.

24. An irradiation device according to claim 23, wherein the double wall connecting pipe defines an outer space and an inner space, wherein the gas pressure in the outer space of the connecting pipe is higher than in the inner space thereof.

* * * * *